(12) United States Patent
Tsai et al.

(10) Patent No.: US 9,136,561 B2
(45) Date of Patent: Sep. 15, 2015

(54) SOLID POLYMER ELECTROLYTE COMPOSITION AND METHOD OF SYNTHESIZING THE SAME

(75) Inventors: Li-Duan Tsai, Hsinchu (TW); Chia-Chen Fang, Taipei (TW); Hsien-Ming Kao, Taoyuan County (TW); Diganta Saikia, Taoyuan County (TW)

(73) Assignees: Industrial Technology Research Institute, Hsinchu (TW); National Central University, Taoyuan (TW)

( * ) Notice: Subject to any disclaimer, the term of this patent is extended or adjusted under 35 U.S.C. 154(b) by 691 days.

(21) Appl. No.: 13/495,985

(22) Filed: Jun. 13, 2012

(65) Prior Publication Data

US 2013/0157122 A1 Jun. 20, 2013

(30) Foreign Application Priority Data

Dec. 15, 2011 (TW) .............................. 100146502 A

(51) Int. Cl.
*H01M 10/056* (2010.01)
*H01M 10/052* (2010.01)
*H01M 10/0565* (2010.01)

(52) U.S. Cl.
CPC .......... *H01M 10/056* (2013.01); *H01M 10/052* (2013.01); *H01M 10/0565* (2013.01); *H01M 2300/0082* (2013.01); *H01M 2300/0091* (2013.01); *Y02E 60/122* (2013.01)

(58) Field of Classification Search
None
See application file for complete search history.

(56) References Cited

U.S. PATENT DOCUMENTS

| 5,283,310 A | 2/1994 | Armand et al. | |
|---|---|---|---|
| 6,576,371 B1 | 6/2003 | Yasuda et al. | |
| 6,664,006 B1 | 12/2003 | Munshi | |
| 6,673,273 B2 | 1/2004 | Ba Le et al. | |
| 2002/0042001 A1* | 4/2002 | Lee ................................ | 429/314 |
| 2003/0094599 A1* | 5/2003 | Le et al. ......................... | 252/500 |
| 2009/0075176 A1 | 3/2009 | Singh et al. | |
| 2009/0176161 A1 | 7/2009 | Sanchez et al. | |

FOREIGN PATENT DOCUMENTS

| CN | 102097652 | | 6/2011 |
|---|---|---|---|
| JP | 2004-273386 | * | 9/2004 |
| JP | 2010-047722 | * | 3/2010 |
| TW | I300634 | | 9/2008 |
| TW | I324409 | | 5/2010 |
| TW | 201043662 | | 12/2010 |

OTHER PUBLICATIONS machine-generated translation for JP 2010-047722.*
machine-generated translation for JP 2004-273386.*
Chien-Fu Chen, "Preparation of Solid Polymer Electrolyte Membrane," Master's thesis, Jun. 2009, Graduate Institute of Chemistry, The National Central University.
"Office Action of Taiwan Counterpart Application", issued on Dec. 18, 2013, p. 1-p. 5, in which the listed references were cited.
Nunes et al., "Di-urea cross-linked poly(oxyethylene)/siloxane ormolytes for lithium batteries", Journal of Electrochemical Society, 2005, vol. 152, No. 2, A429-A438.
Barbosa et al., "Application of di-ureasil ormolytes based on lithium tetrafluoroborate in solidstate electrochromic displays", Journal of Materials Chemistry, 2010, vol. 20, p. 723-p. 730.

\* cited by examiner

*Primary Examiner* — Marc Zimmer
(74) *Attorney, Agent, or Firm* — J.C. Patents

(57) ABSTRACT

A solid polymer electrolyte composition having good conductivity and better mechanical strength is provided. The solid polymer electrolyte composition includes at least one lithium salt and a crosslinking polymer containing at least a first segment, a second segment, a third segment, and a fourth segment. The first segment includes polyalkylene oxide and/or polysiloxane backbone. The second segment includes urea and/or urethane linkages. The third segment includes silane domain. The fourth segment includes phenylene structure. Moreover, the solid polymer electrolyte composition further includes an additive for improving ionic conductivity thereof.

13 Claims, 6 Drawing Sheets

SOLID POLYMER ELECTROLYTE COMPOSITION AND METHOD OF SYNTHESIZING THE SAME

CROSS-REFERENCE TO RELATED APPLICATION

This application claims the priority benefit of Taiwan application serial no. 100146502, filed on Dec. 15, 2011. The entirety of the above-mentioned patent application is hereby incorporated by reference herein and made a part of this specification.

TECHNICAL FIELD

The disclosure relates to a hybrid solid polymer electrolyte composition containing urea and/or urethane, and a method of synthesizing the solid polymer electrolyte composition.

BACKGROUND

Recently, solid polymer electrolytes (SPEs) have received much attention for their many potential applications in the technical field of secondary batteries, dye-sensitive solar cells, super capacitors, electrochromic displays, chemical sensors and the like. In the application of the secondary batteries (e.g., lithium secondary batteries), the solid polymer electrolytes offer many advantages such as a comparatively higher mechanical strength, a superior thermal stability and immunity from leakage.

A solid polymer electrolyte can be classified into a hybrid organic-inorganic electrolyte formed by graftage of inorganic constituents and organic constituents, a plasticized polymer or a gel polymer formed by plasticizer or gelling material, and a composite polymer with additive to increase conductivity. Herein the most commonly used polymer includes polyethylene oxide (PEO), polyacrylonitrile (PAN), polysiloxane and the like. However, in the application of lithium battery, the obstacle of the solid polymer electrolyte still regards to the conductivity being too low and the interface resistance being too high.

SUMMARY

A solid polymer electrolyte composition is introduced herein. The solid polymer electrolyte composition includes at least one lithium salt and a crosslinking polymer containing at least a first segment, a second segment, a third segment, a fourth segment and at least a lithium salt. The first segment may include a polyalkylene oxide backbone and/or a polysiloxane backbone. The second segment may include a urea linkage and/or a urethane linkage. The third segment may include a silane domain. The fourth segment may include a phenylene structure.

A solid polymer electrolyte composition is further introduced herein. The solid polymer electrolyte composition includes at least one lithium salt, a crosslinking polymer, and an additive. The crosslinking polymer contains at least a first segment, a second segment, a third segment, and a fourth segment. The first segment may include a polyalkylene oxide backbone and/or a polysiloxane backbone. The second segment may include a urea linkage and/or a urethane linkage. The third segment may include a silane domain. The fourth segment may include a phenylene structure. The additive is adapted to increase the ionic conductivity of the solid polymer electrolyte composition.

A method of synthesizing a solid polymer electrolyte composition is introduced herein. In the method, a plurality of precursors is reacted to form foregoing crosslinking polymer, and a lithium salt is added to the crosslinking polymer.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
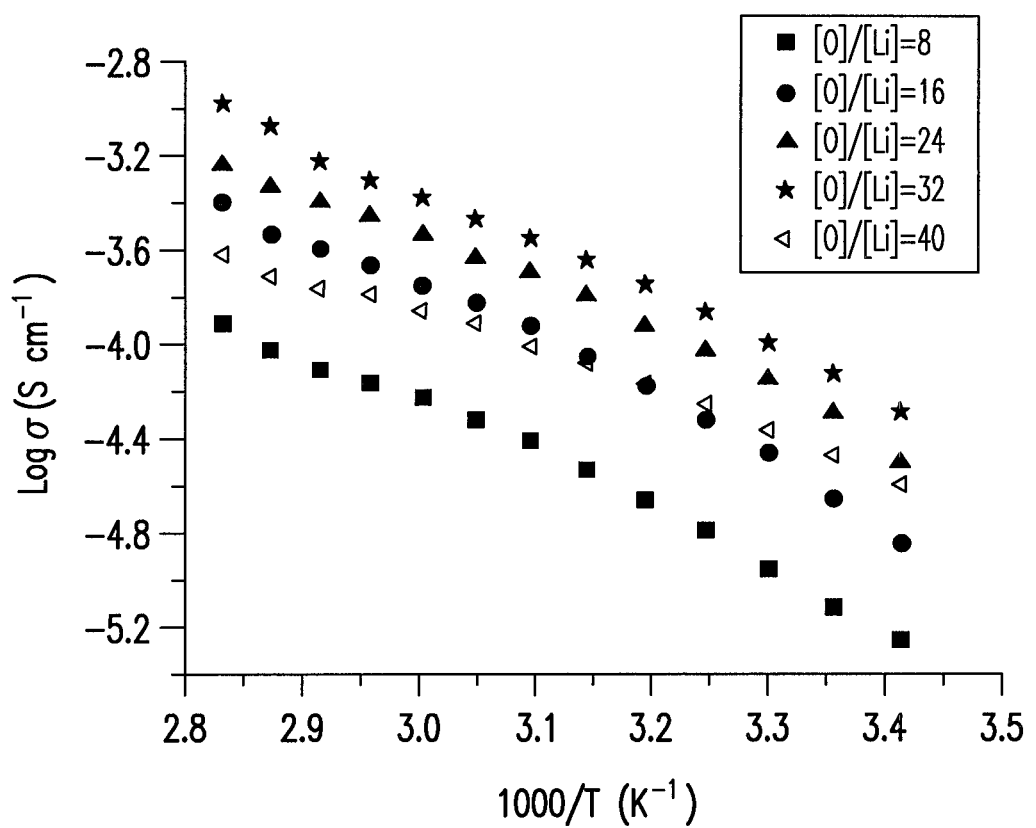
FIG. 1 illustrates the correlation between temperature and ionic conductivity ($\sigma$) of the solid polymer electrolyte compositions according to Experiment 1 to Experiment 5.

In the first embodiment of the disclosure, a solid polymer electrolyte composition including at least one lithium salt and a crosslinking polymer containing at least a first segment, a second segment, a third segment, a fourth segment and at least a lithium salt is provided. The first segment may include a polyalkylene oxide backbone and/or a polysiloxane backbone. The second segment may include a urea linkage and/or a urethane linkage. The third segment may include a silane domain. The fourth segment may include a phenylene structure. In the first embodiment, the first segment, the second segment, the third segment and the fourth segment are bonded by covalent bonds, for example. For instance, the first segment is covalently bonded to the second segment, the second segment is covalently bonded to the third segment and the third segment is covalently bonded to the fourth segment.

In the first embodiment, the method of synthesizing the solid polymer electrolyte composition includes reacting group A, group B and group C as main precursors followed by adding a lithium salt to the resulting reactant. Herein the group A may be selected from one of the following formulae A1 to A3, or the combination thereof; the group B may be selected from one of the following formulae B1 to B3, or the combination thereof; and the group C may be the following formula C.

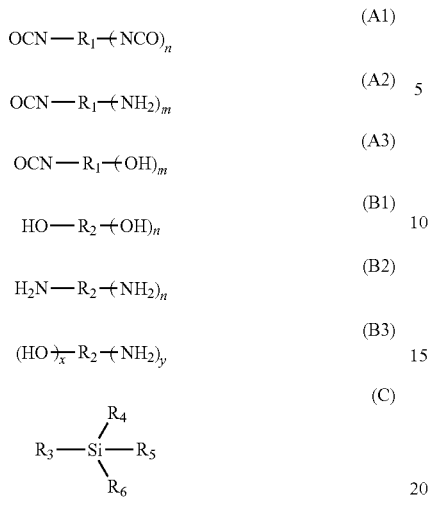

(A1) OCN—R₁—(NCO)ₙ

(A2) OCN—R₁—(NH₂)ₘ

(A3) OCN—R₁—(OH)ₘ

(B1) HO—R₂—(OH)ₙ

(B2) H₂N—R₂—(NH₂)ₙ

(B3) (HO)ₓ—R₂—(NH₂)ᵧ

(C)

In the formulae A1 to A3, $R_1$ represents more than one ethylene oxide, propylene oxide, siloxane, aliphatic, aromatic or the combination thereof; n is an integer selected from a range 0 to 3; and m is an integer selected from a range 1 to 3.

In the formulae B1 to B3, $R_2$ represents more than one ethylene oxide, propylene oxide, siloxane or the combination thereof; n is an integer selected from a range 0 to 3; and x and y are integers selected from a range 2 to 4.

In the formula C, $R_3$ represents a group of $NH_2$, OH or NCO. At least one of $R_4$, $R_5$, and $R_6$ represents H, OH, Cl, $OCH_3$, $OCH_2CH_3$, $OCH_2CH_2CH_3$, $N(CH_3)_2$, $N(CH_2CH_3)_2$, $N[Si(CH_3)_3]_2$, $OSi(CH_3)_3$ or a combination thereof.

The specific examples of the group A are in the following formulae a1 to a6, but the disclosure is not limited thereto.

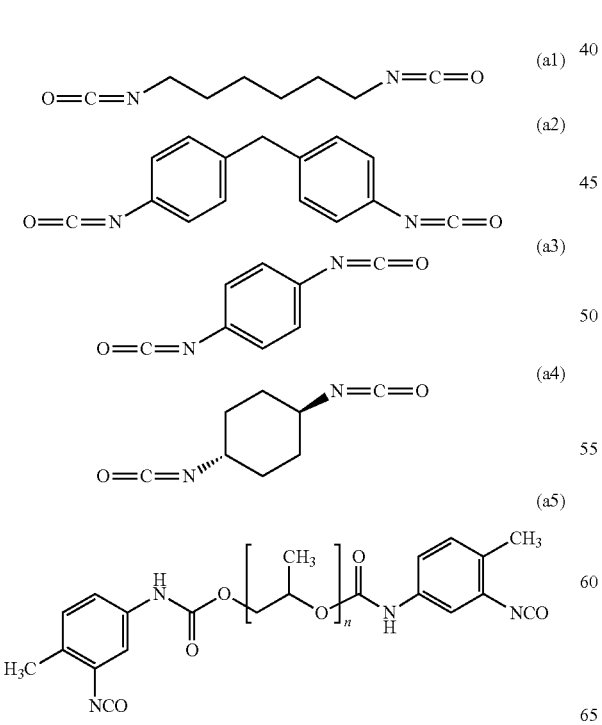

In the formula (a5), n=34.

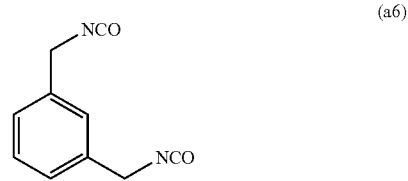

The specific examples of the group B are in the following formulae b1 to b11, but the disclosure is not limited thereto.

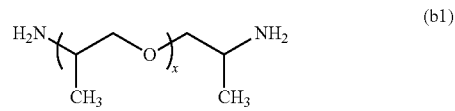

In the formula (1), $2 \leq x \leq 68$.

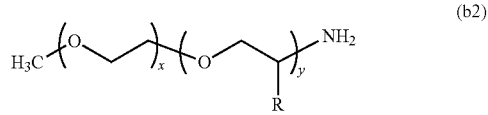

in the formula (b2), $1 \leq x \leq 30$, $1 \leq y \leq 30$, and R represents H or $CH_3$.

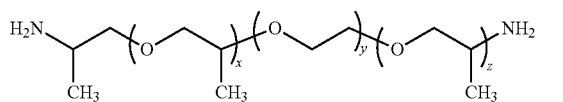

In the formula (b3), $1 \leq x+z \leq 6$, and $2 \leq y \leq 40$.

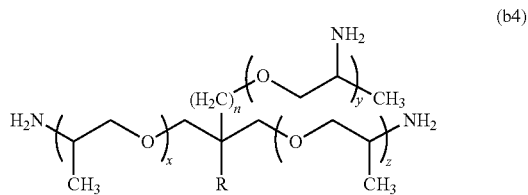

In the formula (b4), $5 \leq x+y+z \leq 85$, and $0 \leq n \leq 1$.

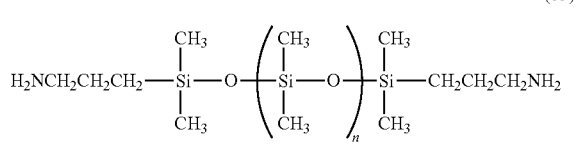

In the formula (b5), 8≤n≤673.

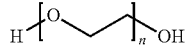
(b6)

In the formula (b6), 2≤n≤2500.

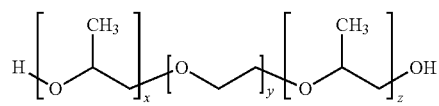
(b7)

In the formula (b7), 3≤x+y+z≤200.

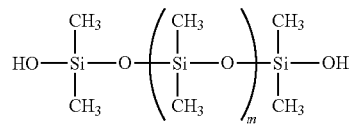
(b8)

In the formula (b8), 2≤m≤1400.

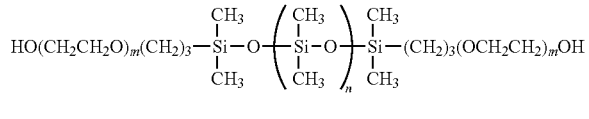
(b9)

In the formula (b9), 113≤n+m≤1364.

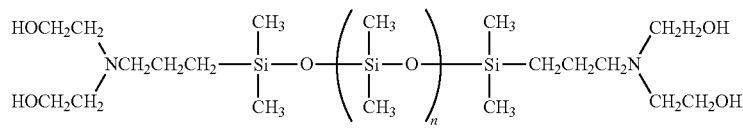
(b10)

In the formula (b10), 3≤n≤40.

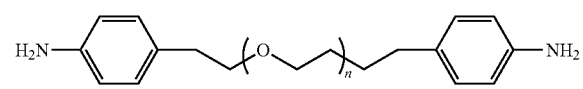
(b11)

In the formula (b11), 2≤n≤20.

The specific examples of the group C are in the following formulae C1 to C3, but the disclosure is not limited thereto.

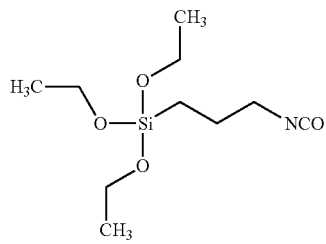
(C1)

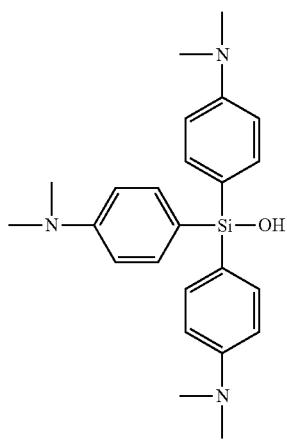
(C2)

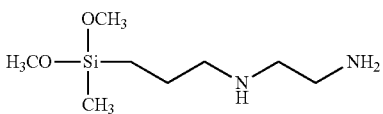
(C3)

In the first embodiment, the lithium salt may include LiPF$_6$, LiClO$_4$, LiBF$_4$, LiSO$_3$CF$_3$, LiN(SO$_2$CF$_3$)$_2$, LiN(SO$_2$CF$_2$CF$_3$)$_2$, LiTFSI, LiAsF$_6$, LiSbF$_6$, LiAlCl$_4$, LiGaCl$_4$, LiNO$_3$, LiC(SO$_2$CF$_3$)$_3$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$, LiB(C$_2$O$_4$)$_2$, or a combination thereof. For the convenience, the lithium salt is, for example, preferably selected from LiPF$_6$, LiClO$_4$, LiTFSI or a combination thereof.

In the first embodiment, the solid polymer electrolyte composition may be formed by a jet coating process, an extrusion process, a molding process, a casting process or a printing process. In the first embodiment, the ratio of oxygen to lithium [O]/[Li] is in a range of 10 to 40, for example. In the first embodiment, the ionic conductivity value of the solid polymer electrolyte composition at 30° C. is at least 1×10$^{-5}$ S/cm.

In the second embodiment of the disclosure, the solid polymer electrolyte composition includes a first segment, a second segment, a third segment, a fourth segment, at least a lithium salt and an additive. The first segment may include a polyalkylene oxide backbone and/or a polysiloxane backbone. The second segment may include a urea linkage and/or a urethane linkage. The third segment may include a silane domain. The fourth segment may include a phenylene structure. The additive is used to increase the ionic conductivity of the solid polymer electrolyte composition. In the second embodiment, the first segment, the second segment, the third segment and the fourth segment are bonded by covalent bonds, for example. For instance, the first segment is covalently bonded to the second segment, the second segment is covalently bonded to the third segment and the third segment is covalently bonded to the fourth segment.

In the second embodiment, the method of synthesizing the solid polymer electrolyte composition is similar to that in the first embodiment except for the addition of an additive.

In the second embodiment, the additive may include inorganic filler or organic filler.

The inorganic oxide particles may include graphene oxide, clay, $SiO_2$, $ZnO$, $SnO_2$, $TiO_2$, $BaTiO_3$, $SrO_2$, $Al_2O_3$ or a combination thereof. The particle size of the inorganic oxide particle is in a range of 5 nm to 1000 nm, for example. The added amount is measured by the total mass of the solid polymer electrolyte composition, and the added amount of the inorganic oxide particles may be less than 20 wt %, and preferably, is less than 10 wt %.

The organic filler may include at least one high dielectric organic plasticizer, for example, propylene carbonate, ethylene carbonate or ethyl-methyl carbonate produced by Novolyte Company.

In the second embodiment, the solid polymer electrolyte composition may be formed by a jet coating process, an extrusion process, a molding process, a casting process or a printing process. In the second embodiment, the ratio of oxygen to lithium [O]/[Li] is in a range of 10 to 40, for example. In the second embodiment, the ionic conductivity value of the solid polymer electrolyte composition at 30° C. is at least $2 \times 10^{-5}$ S/cm.

The experimental examples according to each embodiment are described as follows.

EXPERIMENTAL EXAMPLE

Experiment 1 to Experiment 5

In the following descriptions, the abbreviation PPGTDI represents the poly(propylene glycol) tolylene 2,4-diisocyanate terminated; the average molecular weight is about 2300 g $mol^{-1}$. The formula is described as below.

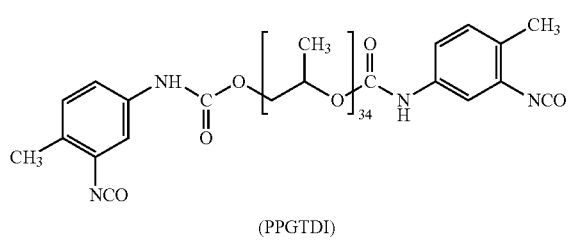

(PPGTDI)

The abbreviation ED2000 (Aldrich, molecular weight (Mw) is approximately 2000 g $mol^{-1}$, containing a+c=3.5 and b=40.5 units, commercially designated by Jeffamine ED2000) represents the poly(propylene glycol)-block-poly (ethylene glycol)-block-poly(propylene glycol)bis(2-aminopropyl ether). The formula is described as below.

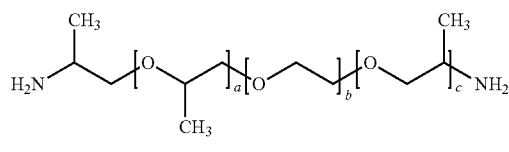

(ED2000)

The abbreviation ICPTES represents 3-isocyanatepropyl-triethoxysilane. The formula is described as below.

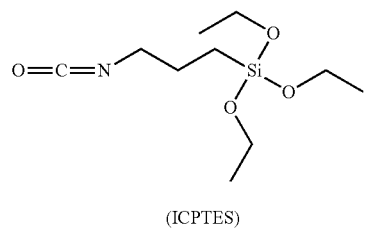 [SMILES: CCO[Si](CCCN=C=O)(OCC)OCC]

(ICPTES)

First, PPDTDI and ED2000 are respectively dissolved in 20 ml of tetrahydrofuran (THF), and stirred under 70° C. The two solutions are then mixed and uninterruptedly for four days to form a crosslinking polymer P1. Thereafter, 2 moles of ICPTES are added to the crosslinking polymer P1, and are uninterruptedly and strongly stirred for four days to form a crosslinking polymer P2. After that, a proper amount of $LiClO_4$ (i.e., lithium salt) is added to the crosslinking polymer P2, till the ratio of oxygen to lithium [O]/[Li] reaches the predetermined value. The value of [O]/[Li] is calculated by estimating the quantity of oxygen in the crosslinking polymer P2 with the concentration of all the reaction precursors (PPDTDI, ED2000 and ICPTES), and the quantity of lithium is calculated by the added amount of lithium salt. In Experiments 1-5, the molar ration of PPDTDI, ED2000 and ICPTES is about 1:2:2.

Then, a small amount of HCL (0.3 ml, 0.05M) is added to catalyze the hydrolyzing and shrinking reaction of the organosilane, so as to form the silicate structure (i.e., the silane domain). And then, it is stirred for an hour in the room temperature, and the solid polymer electrolyte compositions of Experiment 1 to Experiment 5 are formed in the vacuum (80° C.) after the casting process, the dissolvent evaporating and the heating process. The synthesizing method of the solid polymer electrolyte compositions of Experiment 1 to Experiment 5 is the same in substance, the difference is the added amount of the lithium salt and the resulting different value of [O]/[Li].

The structures of the crosslinking polymers P1, P2 and the solid polymer electrolyte composition are described below.

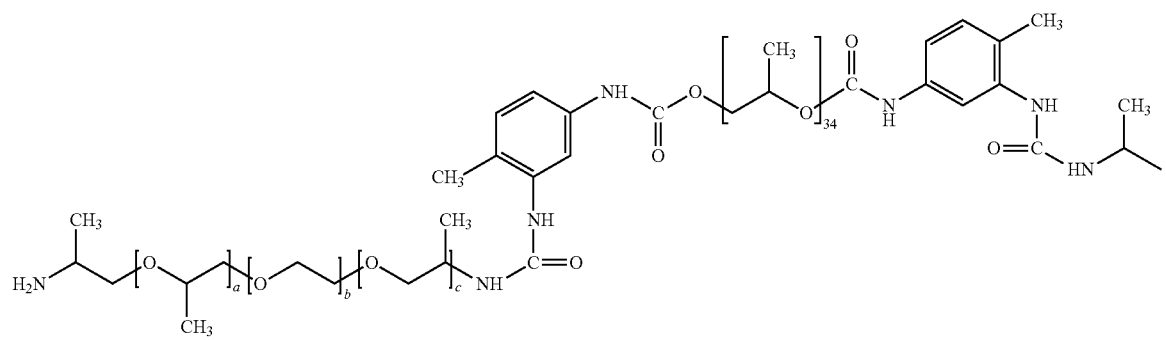
(P1)
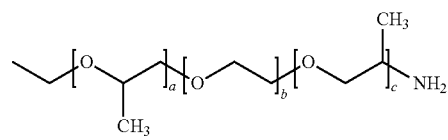
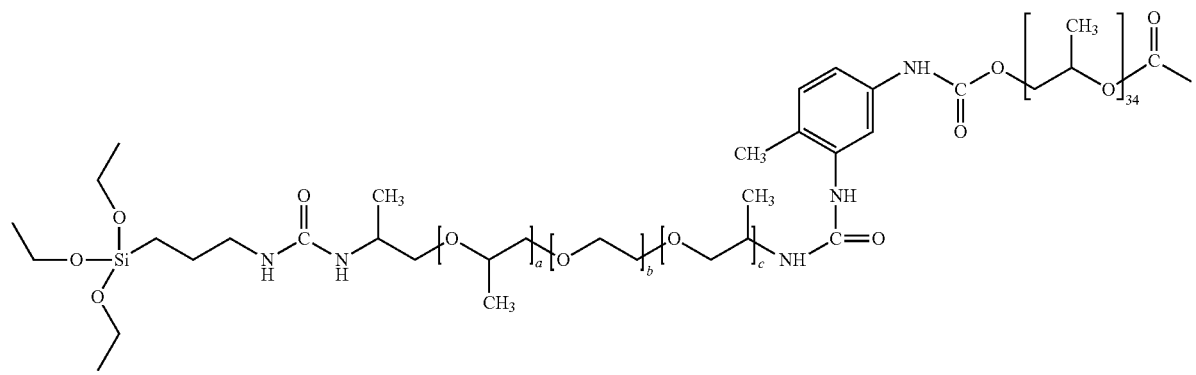
(P2)
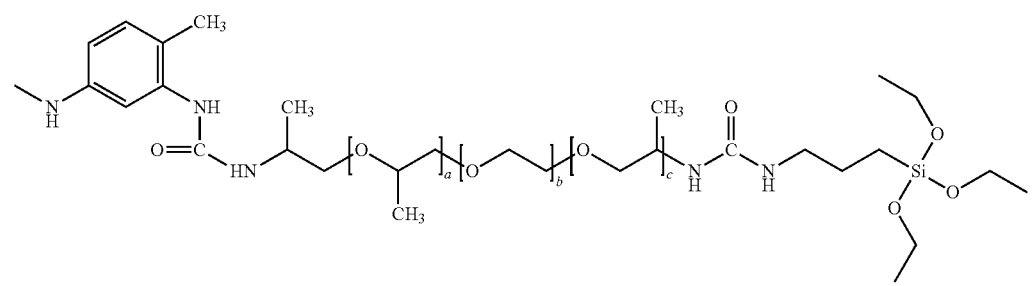

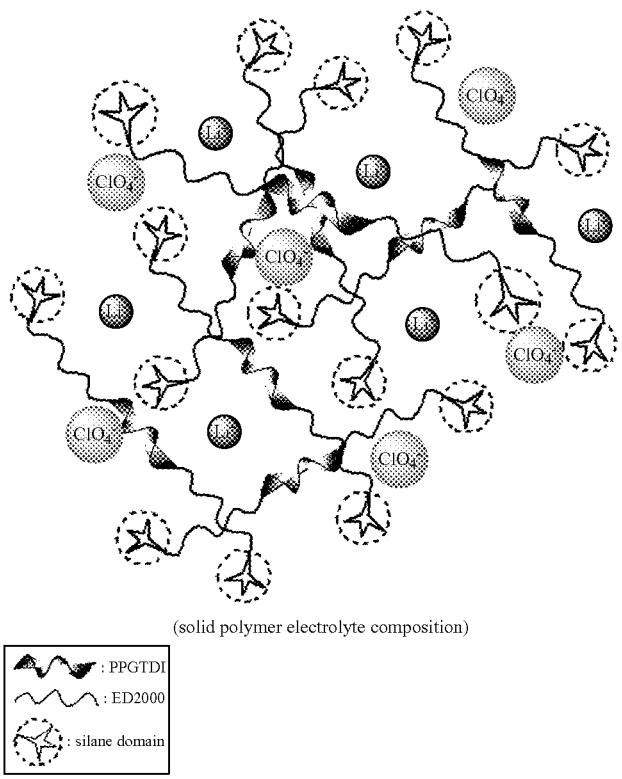

(solid polymer electrolyte composition)

The electrical properties of the solid polymer electrolyte compositions of Experiment 1 to Experiment 5 are measured, and the results are as follows.

FIG. 1 illustrates the correlation between temperature and ionic conductivity (σ) of the solid polymer electrolyte compositions of Experiment 1 to Experiment 5. Table 1 shows the ionic conductivity of each of the solid polymer electrolyte compositions from Experiment 1 to Experiment 5 in the temperature of 30° C. Referring to FIG. 1 and Table 1, the solid polymer electrolyte compositions of Experiment 1 to Experiment 5 have at least the ionic conductivity of $1.1 \times 10^{-5}$ S $cm^{-1}$, and optimum ionic conductivity of $1.01 \times 10^{-4}$ S $cm^{-1}$ is achieved when [O]/[Li]=32.

TABLE 1

|  | [O]/[Li] | σ (S $cm^{-1}$) |
|---|---|---|
| Experiment 1 | 8 | $1.1 \times 10^{-5}$ |
| Experiment 2 | 16 | $3.5 \times 10^{-5}$ |
| Experiment 3 | 24 | $7.2 \times 10^{-5}$ |
| Experiment 4 | 32 | $1.01 \times 10^{-4}$ |
| Experiment 5 | 40 | $4.3 \times 10^{-5}$ |

Figure 2:
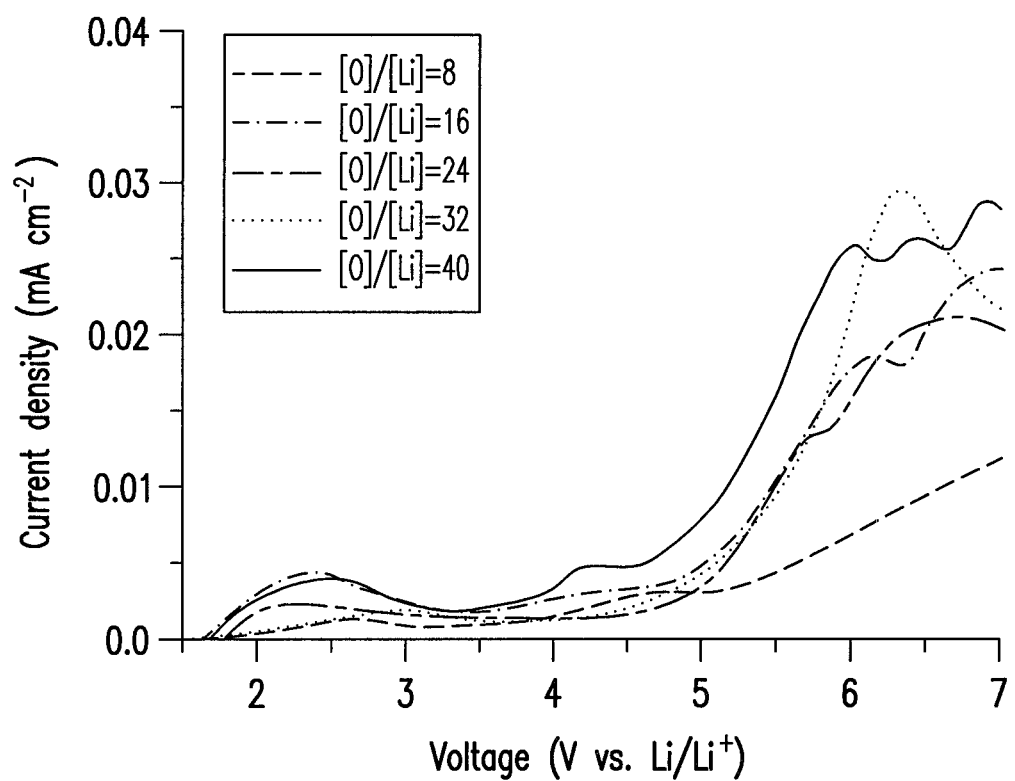
FIG. 2 illustrates the linear sweep voltammogram of the solid polymer electrolyte compositions according to Experiment 1 to Experiment 5.

FIG. 2 illustrates the linear sweep voltammogram of the solid polymer electrolyte composition of Experiment 1 to Experiment 5. Referring to FIG. 2, the solid polymer electrolyte compositions of Experiment 1 to Experiment 5 have the superior electro-chemical stability when the current is in a range of 1.5V to 4.7V.

Experiment 6 to Experiment 11

The synthesizing method of the solid polymer electrolyte compositions of Experiment 6 to Experiment 11 is the same in substance (i.e., synthesized by the same method and [O]/[Li] =32 of Experiment 4), the difference is that in Experiment 6 to Experiment 11, $TiO_2$ particles are used as an additive.

Then, the electrical properties of the solid polymer electrolyte compositions of Experiment 6 to Experiment 11 are measured, and the results are as follows.

Figure 3:
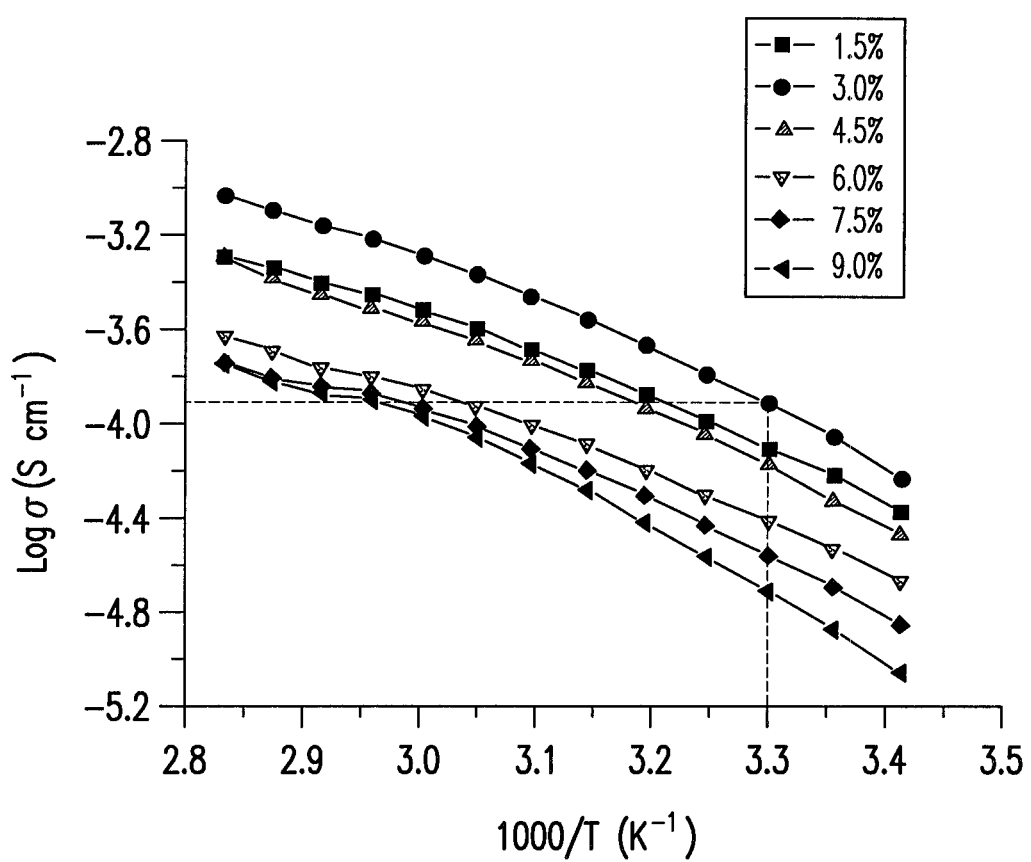
FIG. 3 illustrates the correlation between temperature and ionic conductivity ($\sigma$) of the solid polymer electrolyte compositions according to Experiment 6 to Experiment 11.

Table 2 shows the added amount (wt %) of $TiO_2$ particles and the ionic conductivity of the solid polymer electrolyte composition in the temperature of 30° C. FIG. 3 illustrates the correlation between temperature and ionic conductivity (σ) of the solid polymer electrolyte compositions having different added amount of $TiO_2$ particles.

TABLE 2

|  | $TiO_2$ (wt %) | σ (S $cm^{-1}$) |
|---|---|---|
| Experiment 6 | 1.5 | $1.9 \times 10^{-4}$ |
| Experiment 7 | 3.0 | $3.1 \times 10^{-4}$ |
| Experiment 8 | 4.5 | $1.6 \times 10^{-4}$ |
| Experiment 9 | 6.0 | $9.7 \times 10^{-5}$ |
| Experiment 10 | 7.5 | $6.9 \times 10^{-5}$ |
| Experiment 11 | 9.0 | $4.9 \times 10^{-5}$ |

Referring to FIG. 3 and Table 2, the ionic conductivity of solid polymer electrolyte composition may be successfully increased if a proper amount of $TiO_2$ is added. When the added amount of $TiO_2$ particles is equal to 3 wt %, the solid polymer electrolyte composition has optimum ionic conductivity according to Experiment 6 to Experiment 11.

Experiment 12 to Experiment 19

The abbreviation XDI represents m-Xylylene diisocyanate in the following. The formula is described as below.

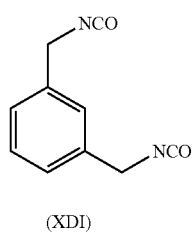

(XDI)

The abbreviation ED2003 represents the chemical composition, listed below (molecular weight is approximately 2000), of JEFFAMINE® trademark.

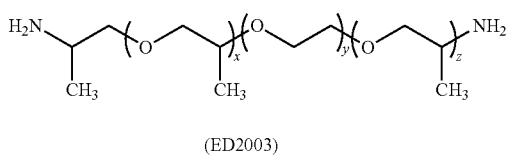

(ED2003)

Herein $x + z \approx 6.0$ and $y \approx 39$.

The abbreviation EC represents ethylene carbonate, the formula is shown below.

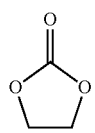

(EC)

The abbreviation PC represents propylene carbonate, the formula is shown below.

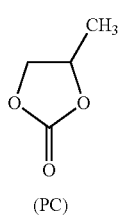

(PC)

The abbreviation LiTFSI represents Bis(trifluoromethane)-sulfonimide lithium salt, and the formula is shown below.

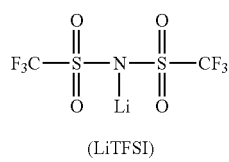

(LiTFSI)

The method of synthesizing the solid polymer electrolyte compositions of Experiment 12 to Experiment 16 is the same as Experiment 1. The difference is that LiTFSI is used as the lithium salt and PPGTDI and ED2000 of Experiment 1 are respectively replaced by XDI and ED2003.

Figure 4:
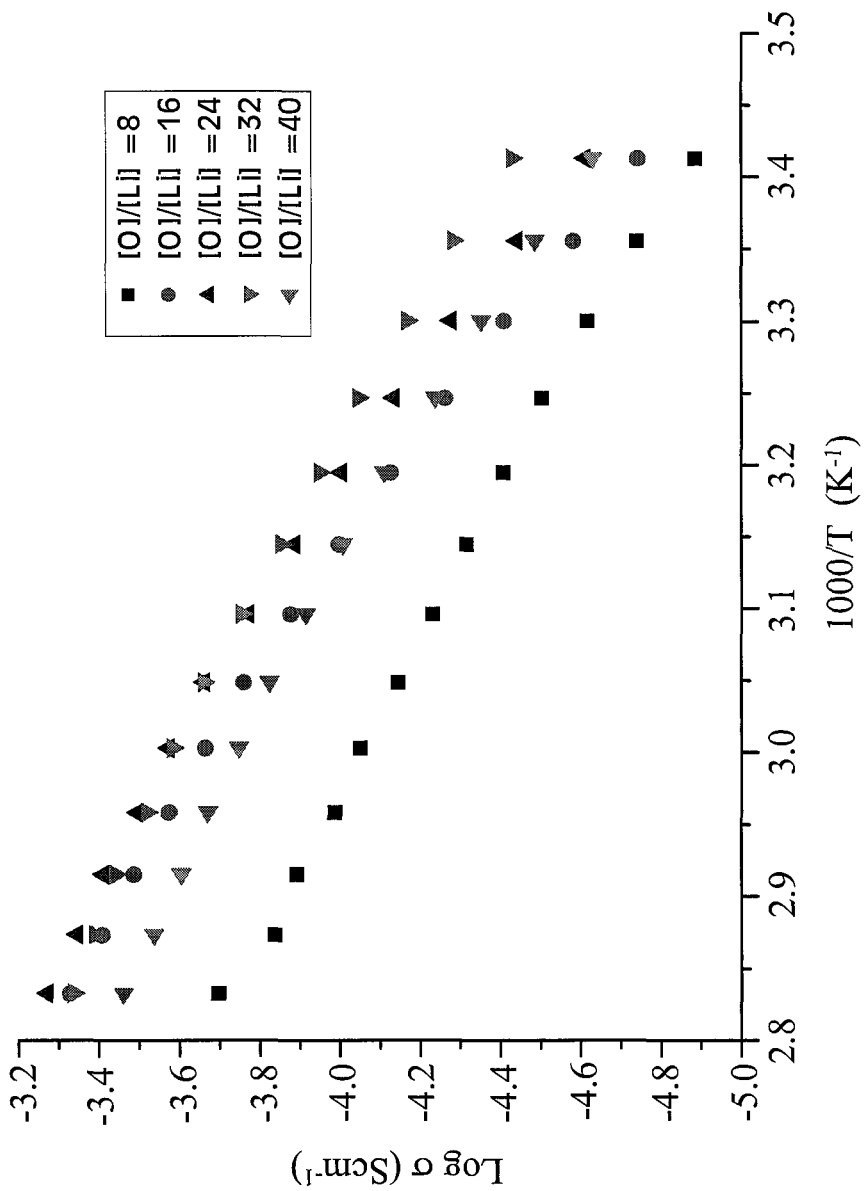
FIG. 4 illustrates the correlation between temperature and ionic conductivity ($\sigma$) of the solid polymer electrolyte compositions according to Experiment 12 to Experiment 16.

FIG. 4 illustrates the correlation between temperature and ionic conductivity (σ) of the solid polymer electrolyte compositions of Experiment 12 to Experiment 16. Table 3 shows the value of [O]/[Li] of Experiment 12 to Experiment 16 in the temperature of 30° C.

Referring to FIG. 4 and Table 3, the solid polymer electrolyte composition have a higher ionic conductivity when the value of [O]/[Li] is in a range of 10 to 40.

TABLE 3

|  | [O]/[Li] | σ (S cm$^{-1}$) |
| --- | --- | --- |
| Experiment 12 | 8 | $2.4 \times 10^{-5}$ |
| Experiment 13 | 16 | $3.9 \times 10^{-5}$ |
| Experiment 14 | 24 | $5.3 \times 10^{-5}$ |
| Experiment 15 | 32 | $6.8 \times 10^{-5}$ |
| Experiment 16 | 40 | $4.4 \times 10^{-5}$ |

The solid polymer electrolyte compositions of Experiment 17 to Experiment 19 are similar to that of Experiment 12 to Experiment 16, the difference is: in Experiment 17 to Experiment 19, LiTFSI is first dissolved in plasticizer solution (EC/PC=1:1) with different concentration before it is added.

Figure 5:
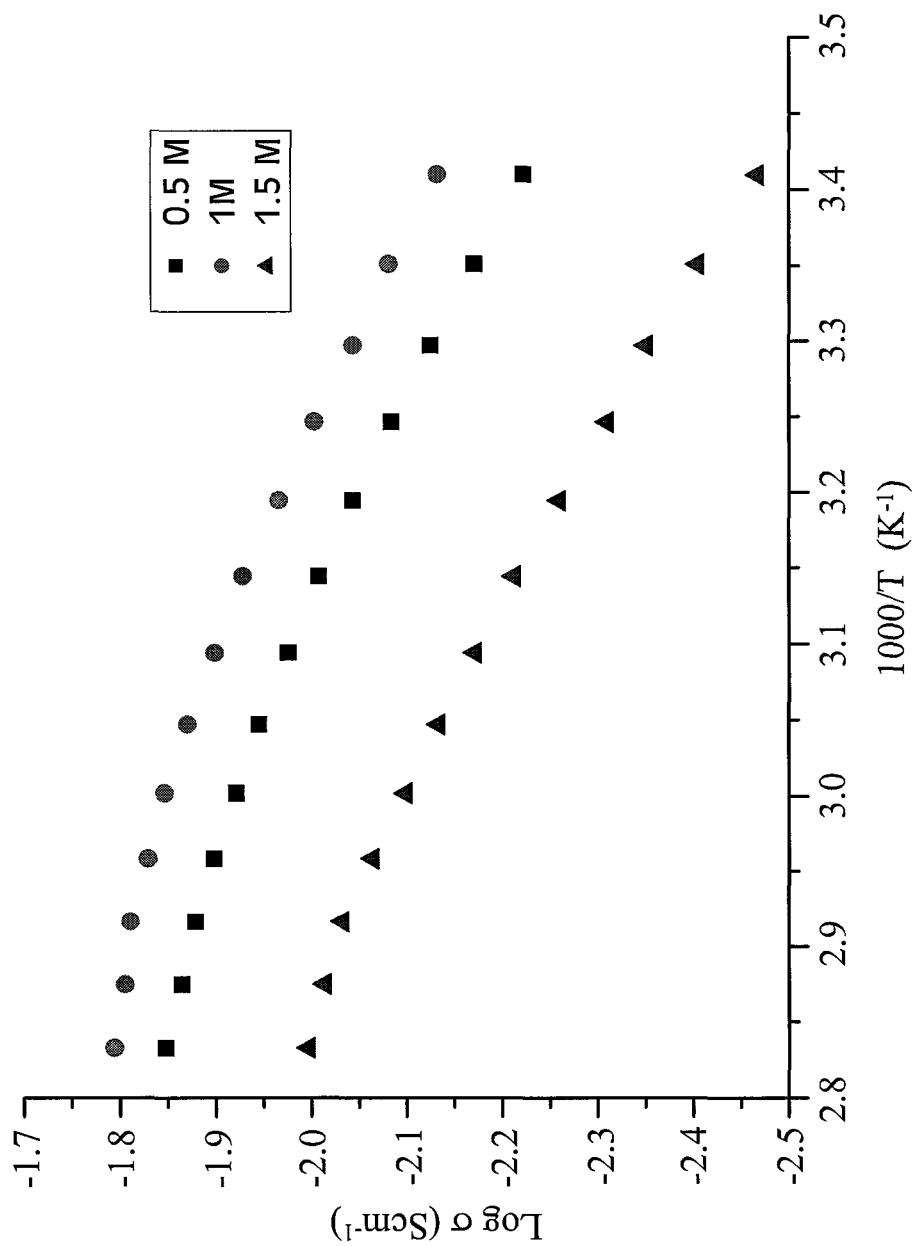
FIG. 5 illustrates the correlation between temperature and ionic conductivity ($\sigma$) of the solid polymer electrolyte compositions according to Experiment 17 to Experiment 19.

FIG. 5 illustrates the correlation between temperature and ionic conductivity (σ) of the solid polymer electrolyte compositions of Experiment 17 to Experiment 19. Table 4 shows the value of [O]/[Li] of Experiment 17 to Experiment 19 in the temperature of 30° C.

Referring to FIG. 5 and Table 4, the correlation between the concentration of LiTFSI and the ionic conductivity of solid polymer electrolyte composition, wherein 1M of LiTFSI has a higher conductivity.

TABLE 4

|  | LiTFSI in EC/PC | σ (S cm$^{-1}$) |
| --- | --- | --- |
| Experiment 17 | 0.5M | $7.5 \times 10^{-3}$ |
| Experiment 18 | 1.0M | $9.1 \times 10^{-3}$ |
| Experiment 19 | 1.5M | $4.5 \times 10^{-3}$ |

Experiment 20 to Experiment 24

The solid polymer electrolyte compositions of Experiment 20 to Experiment 24 are similar to that of Experiment 12 to Experiment 16, the difference is: LiTFSI is replaced by LiPF$_6$.

Figure 6:
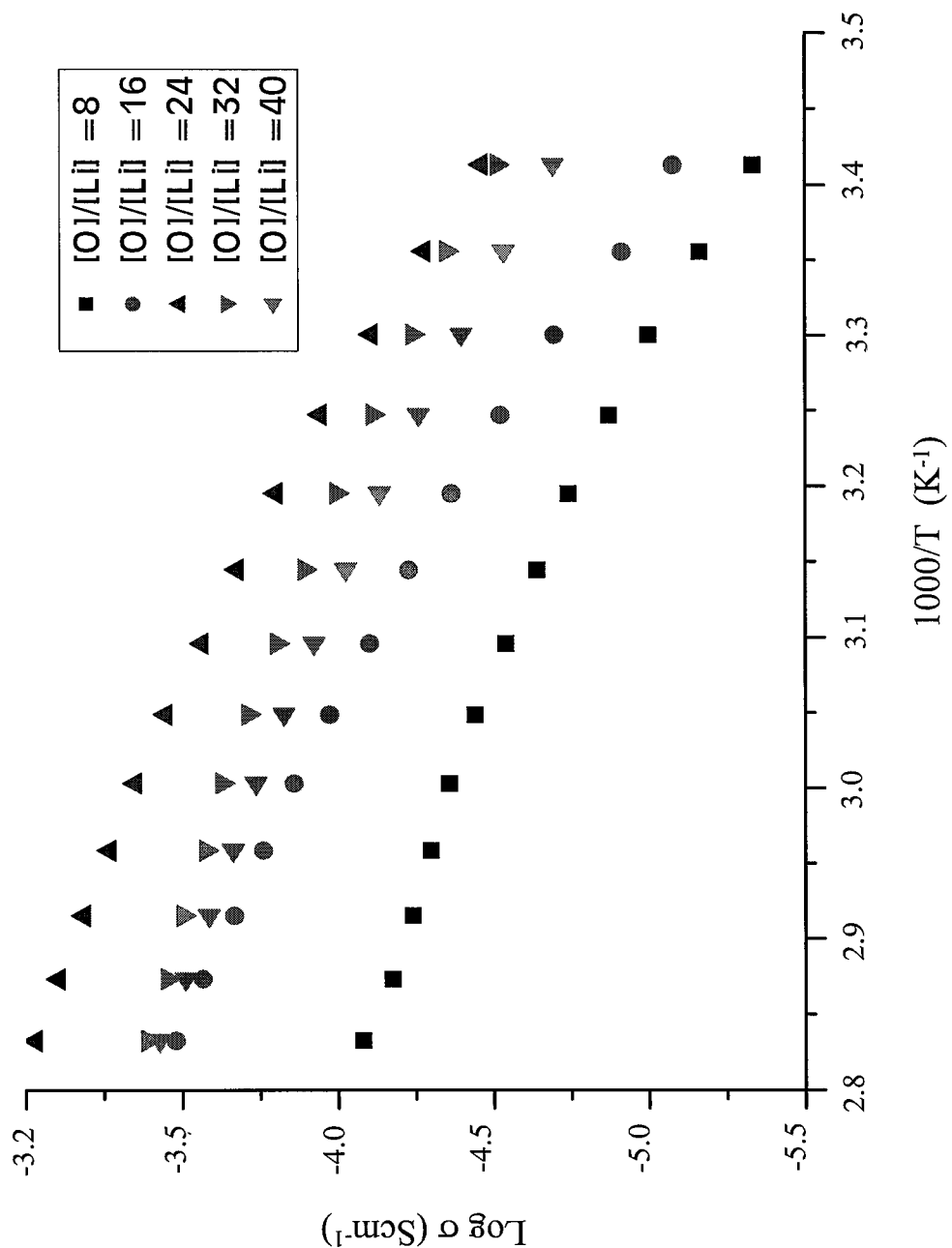
FIG. 6 illustrates the correlation between temperature and ionic conductivity ($\sigma$) of the solid polymer electrolyte compositions according to Experiment 20 to Experiment 24.

FIG. 6 illustrates the correlation between temperature and ionic conductivity (σ) of the solid polymer electrolyte compositions of Experiment 20 to Experiment 24. Table 5 shows the value of [O]/[Li] of Experiment 20 to Experiment 24 in the temperature of 30° C.

Referring to FIG. 6 and Table 5, the solid polymer electrolyte composition have a higher ionic conductivity when the value of [O]/[Li] is in a range of 10 to 40.

TABLE 5

|  | [O]/[Li] | σ (S cm$^{-1}$) |
| --- | --- | --- |
| Experiment 20 | 8 | $1.1 \times 10^{-5}$ |
| Experiment 21 | 16 | $2.0 \times 10^{-5}$ |
| Experiment 22 | 24 | $7.8 \times 10^{-5}$ |
| Experiment 23 | 32 | $5.8 \times 10^{-5}$ |
| Experiment 24 | 40 | $4.0 \times 10^{-5}$ |

In light of the foregoing, the solid polymer electrolyte composition of the disclosure may improve the leakage problem of the battery caused by the liquid electrolyte. The efficiency and the safety of battery may be improved when the solid polymer electrolyte composition is applied to the lithium battery. In addition, since the solid polymer electrolyte composition has branch structure, crystallinity of the solid polymer electrolyte composition may be decreased while the ionic conductivity may also be increased. Moreover, the ionic conductivity of the solid polymer electrolyte composition may further be increased by adding the additive, and ionic conductivity of $3.1 \times 10^{-4}$ S cm$^{-1}$ may be obtained in the temperature of 30° C. The additive may further optimize the mechanical strength and thermal stability of the solid polymer electrolyte composition.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A solid polymer electrolyte composition, comprising:
   at least one lithium salt; and
   a crosslinking polymer, comprising:
   a first segment comprising a polyalkylene oxide backbone and/or polysiloxane backbone;
   a second segment comprising a urea linkage and/or a urethane linkage;
   a third segment comprising a silane domain; and
   a fourth segment comprising a phenylene structure,
   wherein an ionic conductivity value of the solid polymer electrolyte composition at 30° C. is at least $1 \times 10^{-5}$ S/cm.

2. The solid polymer electrolyte composition as claimed in claim 1, wherein the first segment, the second segment, the third segment and the fourth segment are bonded by covalent bonds.

3. The solid polymer electrolyte composition as claimed in claim 1, wherein the lithium salt comprises LiPF$_6$, LiClO$_4$, LiBF$_4$, LiSO$_3$CF$_3$, LiN(SO$_2$CF$_3$)$_2$, LiN(SO$_2$CF$_2$CF$_3$)$_2$, LiTFSI, LiAsF$_6$, LiSbF$_6$, LiAlCl$_4$, LiGaCl$_4$, LiNO$_3$, LiC(SO$_2$CF$_3$)$_3$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$, LiB(C$_2$O$_4$)$_2$, or a combination thereof.

4. The solid polymer electrolyte composition as claimed in claim 1, wherein a ratio of oxygen to lithium [O]/[Li] is in a range of 10 to 40.

5. A solid polymer electrolyte composition, comprising:
   at least one lithium salt;
   a crosslinking polymer, comprising:
   a first segment comprising polyalkylene oxide backbone and/or polysiloxane backbone;
   a second segment comprising a urea linkage and/or a urethane linkage;
   a third segment comprising a silane domain; and
   a fourth segment comprising a phenylene structure; and
   an additive comprising an inorganic filler or an organic filler,
   wherein an ionic conductivity value of the solid polymer electrolyte composition at 30° C. is at least $2 \times 10^{-5}$ S/cm.

6. The solid polymer electrolyte composition as claimed in claim 5, wherein the inorganic filler comprises inorganic oxide particles.

7. The solid polymer electrolyte composition as claimed in claim 6, wherein the inorganic oxide particles comprise graphene oxide, clay, SiO$_2$, ZnO, SnO$_2$, TiO$_2$, BaTiO$_3$, SrO$_2$, Al$_2$O$_3$ or a combination thereof.

8. The solid polymer electrolyte composition as claimed in claim 6, wherein a particle size of the inorganic oxide particles is in a range of 5 nm to 1000 nm.

9. The solid polymer electrolyte composition as claimed in claim 6, wherein an added amount of the inorganic oxide particles is less than 20 wt % of the solid polymer electrolyte composition.

10. The solid polymer electrolyte composition as claimed in claim 5, wherein the organic filler comprises propylene carbonate, ethylene carbonate or ethyl-methyl carbonate.

11. The solid polymer electrolyte composition as claimed in claim 5, wherein the first segment, the second segment, the third segment and the fourth segment are bonded by covalent bonds.

12. The solid polymer electrolyte composition as claimed in claim 5, wherein the lithium salt comprises LiPF$_6$, LiClO$_4$, LiBF$_4$, LiSO$_3$CF$_3$, LiN(SO$_2$CF$_3$)$_2$, LiN(SO$_2$CF$_2$CF$_3$)$_2$, LiTFSI, LiAsF$_6$, LiSbF$_6$, LiAlCl$_4$, LiGaCl$_4$, LiNO$_3$, LiC(SO$_2$CF$_3$)$_3$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$, LiB(C$_2$O$_4$)$_2$, or a combination thereof.

13. The solid polymer electrolyte composition as claimed in claim 5, wherein a ratio of oxygen to lithium [O]/[Li] is in a range of 10 to 40.

* * * * *